US012697891B2

(12) United States Patent
Luckert et al.

(10) Patent No.: US 12,697,891 B2
(45) Date of Patent: Aug. 4, 2026

(54) CHARGING FLAP SYSTEM FOR A MOTOR VEHICLE

(71) Applicant: BOS GmbH & Co. KG, Ostfildern (DE)

(72) Inventors: Thomas Luckert, Göppingen (DE); Sebastian Sitzler, Filderstadt (DE)

(73) Assignee: BOS GMBH & CO. KG, Ostfildern (DE)

( * ) Notice: Subject to any disclaimer, the term of this patent is extended or adjusted under 35 U.S.C. 154(b) by 56 days.

(21) Appl. No.: 18/898,909

(22) Filed: Sep. 27, 2024

(65) Prior Publication Data

US 2025/0108713 A1 Apr. 3, 2025

(30) Foreign Application Priority Data

Sep. 28, 2023 (DE) ..................... 10 2023 126 418.4

(51) Int. Cl.
*E05B 81/72* (2014.01)
*B60L 53/16* (2019.01)
*E05B 83/34* (2014.01)

(52) U.S. Cl.
CPC .............. *B60L 53/16* (2019.02); *E05B 81/72* (2013.01); *E05B 83/34* (2013.01)

(58) Field of Classification Search
CPC .......... B60L 53/16; E05B 81/72; E05B 81/04; E05B 81/06; E05B 81/54; E05B 81/56;
(Continued)

(56) References Cited

U.S. PATENT DOCUMENTS 3,697,943 A * 10/1972 Andres ................... E05B 81/52
340/687
6,653,810 B2 * 11/2003 Lo .......................... G05B 19/18
318/113
(Continued)

FOREIGN PATENT DOCUMENTS

CN 110593678 A * 12/2019 ......... G07C 9/00571
CN 113073917 A * 7/2021 ........... E05F 15/603
(Continued)

OTHER PUBLICATIONS

German Office Action issued in corresponding German Application No. 10 2023 126 418.4, issued Jun. 13, 2024 (4 pages).

*Primary Examiner* — Steven A Tullia
(74) *Attorney, Agent, or Firm* — FLYNN THIEL, P.C.

(57) ABSTRACT

A charging flap system with a charging flap movable between a closed position closing a vehicle charging port and an opened position exposing the port. An electric drive unit moves the charging flap between the opened and closed positions, an electronic control unit controls the drive unit, a blocking device locks or releases the charging flap when closed, and a monitoring device detects a locked or non-locked state of the charging flap when closed. A monitoring system is associated with the electronic control unit and has a control function for the control unit and a monitoring function for the blocking device that interact with one another such that the control function moves the charging flap in the direction of the opened position when the charging flap is closed. The monitoring function records parameters allows the locked or non-locked state of the charging flap to be detected when closed.

18 Claims, 3 Drawing Sheets

(58) Field of Classification Search
CPC .......... E05B 81/64; E05B 81/70; E05B 83/34;
E05B 83/28; Y02T 10/70; Y10T
292/1043; B60K 15/05; B60K 2015/0515;
B60K 2015/0538
See application file for complete search history.

(56) References Cited

U.S. PATENT DOCUMENTS

| | | | | |
|---|---|---|---|---|
| 7,170,253 | B2 * | 1/2007 | Spurr | E05B 81/54 |
| | | | | 318/400.38 |
| 8,845,001 | B2 * | 9/2014 | Kotama | E05C 19/022 |
| | | | | 296/97.22 |
| 9,327,594 | B2 * | 5/2016 | Georgi | E05B 77/54 |
| 9,969,354 | B2 * | 5/2018 | Kojima | B60R 25/01 |
| 10,711,506 | B2 * | 7/2020 | Rhodes | E05F 15/603 |
| 10,759,290 | B2 * | 9/2020 | Sha | E05F 15/603 |
| 11,215,004 | B2 * | 1/2022 | Molnar | E05F 15/616 |
| 11,872,877 | B2 * | 1/2024 | Tani | E05B 47/0046 |
| 12,128,777 | B2 * | 10/2024 | Aoki | B60L 53/14 |
| 12,134,315 | B2 * | 11/2024 | Tani | E05C 19/022 |
| 12,392,187 | B2 * | 8/2025 | Hegwein | E05B 83/34 |
| 12,420,630 | B2 * | 9/2025 | Takemura | B60K 15/04 |
| 12,454,174 | B2 * | 10/2025 | Ciarmatori | E05B 81/06 |
| 12,475,747 | B2 * | 11/2025 | Lv | B60Q 1/543 |
| 12,523,079 | B2 * | 1/2026 | Scott-Collins | E05F 15/611 |
| 2007/0274695 | A1 * | 11/2007 | Chevalier | E05B 81/66 |
| | | | | 388/907.2 |
| 2012/0313382 | A1 * | 12/2012 | Lee | E05B 83/34 |
| | | | | 292/144 |
| 2016/0349908 | A1 * | 12/2016 | Sugiura | E05B 81/64 |
| 2017/0089103 | A1 * | 3/2017 | Ottino | E05B 81/06 |
| 2020/0318399 | A1 * | 10/2020 | Ueki | G07C 5/08 |
| 2021/0301562 | A1 * | 9/2021 | Cumbo | B60J 5/105 |
| 2022/0009365 | A1 * | 1/2022 | Ando | B60R 25/01 |
| 2022/0136292 | A1 * | 5/2022 | Sun | E05B 81/18 |
| | | | | 49/280 |
| 2022/0213728 | A1 * | 7/2022 | Ilardo | B60K 15/05 |
| 2023/0151669 | A1 * | 5/2023 | Scott-Collins | E05F 15/611 |
| | | | | 439/306 |
| 2024/0011346 | A1 * | 1/2024 | Sproule | E05B 83/34 |
| 2024/0075824 | A1 * | 3/2024 | Shibata | H01R 13/7172 |
| 2024/0109409 | A1 * | 4/2024 | Cretin | B60K 15/05 |
| 2024/0159095 | A1 * | 5/2024 | Sha | B60L 53/16 |
| 2024/0294077 | A1 * | 9/2024 | LaCross | B60S 1/66 |
| 2024/0328229 | A1 * | 10/2024 | Peterson | E05B 83/34 |
| 2024/0360706 | A1 * | 10/2024 | Sun | E05B 81/70 |
| 2024/0401380 | A1 * | 12/2024 | Tanaka | B60L 53/11 |

FOREIGN PATENT DOCUMENTS

| | | | | | | |
|---|---|---|---|---|---|---|
| CN | 113460173 | A | * | 10/2021 | | B60L 53/22 |
| CN | 113833368 | A | * | 12/2021 | | E05B 81/72 |
| CN | 114013516 | A | * | 2/2022 | | B60L 53/16 |
| CN | 114150944 | A | * | 3/2022 | | E05B 81/06 |
| CN | 114633812 | A | * | 6/2022 | | B60L 53/16 |
| CN | 115234106 | A | * | 10/2022 | | E05B 83/36 |
| CN | 118928558 | A | * | 11/2024 | | B60L 53/16 |
| DE | 102021002425 | A1 | | 11/2022 | | |
| GB | 2318610 | A | * | 4/1998 | | E05B 81/64 |
| JP | 4092811 | B2 | * | 5/2008 | | B60L 50/16 |
| JP | 2015086606 | A | * | 5/2015 | | E05B 85/22 |
| WO | WO-2013171006 | A1 | * | 11/2013 | | E05B 81/64 |
| WO | WO-2016120324 | A1 | * | 8/2016 | | B60K 15/05 |
| WO | WO-2021098893 | A1 | * | 5/2021 | | E05B 81/64 |
| WO | WO-2022124354 | A1 | * | 6/2022 | | E05B 81/76 |
| WO | WO-2023006743 | A1 | * | 2/2023 | | E05B 81/70 |

* cited by examiner

CHARGING FLAP SYSTEM FOR A MOTOR VEHICLE

CROSS-REFERENCE TO RELATED APPLICATION

This claims priority from German Application No. 10 2023 126 418.4, filed Sep. 28, 2023, the disclosure of which is hereby incorporated by reference in its entirety.

TECHNICAL FIELD

The invention relates to a charging flap system for a motor vehicle, with a charging flap movable between a closed position closing a charging port on the vehicle side and an opened position exposing said charging port; with an electric drive unit that moves the charging flap between the opened position and the closed position; with an electronic control unit for controlling the drive unit; with an in particular electrically operable blocking device intended for locking or releasing the charging flap in its closed position; and with a monitoring device for detecting a locked or non-locked state of the charging flap in its closed position.

BACKGROUND AND SUMMARY

A charging flap system of this type for motor vehicles with an electric drive is generally known. A corresponding motor vehicle has a charging port on the vehicle side which is provided with a socket for inserting a charging plug of a charging cable. The charging port is closable by a charging flap which is mounted as to be movable, relative to the motor vehicle, between a closed position covering the charging port and an opened position exposing said charging port. An electric drive unit is provided for moving the charging flap between the closed position and the opened position. In the closed position of the charging flap, the latter is lockable relative to the charging port by means of a linear actuator. The electric drive unit for moving the charging flap is controllable by an electronic control unit. A sensor system, which detects whether or not the linear actuator is holding the charging flap in the locked position, is also associated with the linear actuator. A corresponding sensor system interacts with a control device on the vehicle side.

One object underlying the invention is to provide a charging flap system of the type mentioned at the outset which permits secure locking of the charging flap to the charging port, independently of a connection to control devices on the vehicle side.

This is achieved in that a monitoring system is associated with the electronic control unit as a monitoring device comprising a control function of the control unit and a monitoring function for the blocking device that interact with one another such that the control function moves the charging flap in the direction of the opened position when the charging flap is in the closed position, and in that the monitoring function records in time-dependent manner parameters, in particular electric parameters, which allow the locked or non-locked state of the charging flap in the closed position to be detected. In accordance with the invention, self-sufficient monitoring of the charging flap system is achieved without an external control device being needed on the vehicle side. In accordance with the invention, the drive unit for the charging flap is operated in the closed position of said charging flap in such a way that the latter is moved in the direction of the opened position. At the same time, the monitoring function records parameters that allow detection of whether or not the locked state of the charging flap, achievable by the blocking device, has been achieved in its closed position. The monitoring function and the control function may be provided in a hardware or in a software. An external sensor system connected to a control device on the vehicle side is not needed due to the solution in accordance with the invention. The electronic control unit for the drive unit of the charging flap is advantageously coupled to an electronic control of the drive such that starting of the drive is not possible until the monitoring system has determined the locking of the charging flap in its closed position. The opening movement of the charging flap out of its closed position takes place only over a limited time and a limited travel that are sufficient to determine whether or not the charging flap is locked in its closed position. The solution in accordance with the invention is suitable in a particularly advantageous manner for passenger cars with an electric drive, whether as a purely electric drive or as a hybrid drive. It is essential for the solution in accordance with the invention that a power storage system such as a battery arrangement or a storage battery is designed to be rechargeable.

In one embodiment of the invention, a sensor system is provided that detects a change in the position of the charging flap after activation of the control function and is connected to the electronic control unit. The corresponding sensor system may be formed by a Hall sensor which may be associated with a swivel axis of the charging flap if said charging flap is swivelably mounted relative to the charging port.

In a further embodiment of the invention, a force sensor is associated with the charging flap and is coupled to the monitoring function in order to transmit force values to said monitoring function in time-dependent manner. The force sensor can detect an increased force if the charging flap comes up against a positive resistance, i.e. locking by the blocking device, during its opening movement out of the closed position. This increase in force can be evaluated in time-dependent manner.

In a further embodiment of the invention, the monitoring function is configured to record current change parameters of the electric drive unit in time-dependent manner. This embodiment proceeds from the knowledge that a controlled movement of the charging flap out of the closed position in the direction of the opened position, with the aid of the electric drive unit, leads to an increased current requirement if the charging flap comes up against a locked stop of the blocking device during an opening operation.

In a further embodiment of the invention, a current level change is provided as a current change parameter and is evaluable by the control unit of the drive unit. A controlled movement of the charging flap out of the closed position in the direction of the opened position over a limited period, in particular a period of 250 ms, results in a major change in the current level if the charging flap comes up against the locked stop. This signals to the control unit of the drive unit that the charging flap is locked in its closed position, so that the control unit can transmit a corresponding signal, that the drive can be started, to a control of the drive of the motor vehicle. If a significant increase in the current requirement does not result during a corresponding opening movement of the charging flap, the control unit concludes that the charging flap is not locked in the closed position. Accordingly, no enabling signal is given for starting the drive.

In a further embodiment of the invention, a current phase change is provided as a current change parameter and is evaluable by the control unit of the drive unit. This embodiment is advantageous in the case of an electric drive unit having an electric drive motor which is operated either multiphase with direct current or with alternating or three-phase current. A time sequence and a magnitude of the amplitudes of the current phases may change here within the defined period of the opening movement for the charging flap. Alternatively, the number of zero crossings of corresponding curves of the current phases may change.

In a further embodiment of the invention, a change in a current ripple is provided as a current change parameter and is evaluable by the control unit of the drive unit. Here too it is the case that different scenarios result depending on whether or not the charging flap is locked in its closed position.

In a further embodiment of the invention, the electronic control unit is designed as a data processing system, and the control function and the monitoring function are configured as a data processing program stored in a memory of the electronic control unit. The memory may be designed as a storage medium coupled to the electronic control unit or as a memory integrated into the electronic control unit that becomes usable when electrically activated. Preferably, the data processing system is configured as a microcontroller in which appropriate software is programmed to achieve the functions of a monitoring system.

In a further embodiment of the invention, the electronic control unit is coupled to a drive control of the motor vehicle such that starting of the drive is blocked when an unlocked charging flap is detected in the closed position of the charging flap. This embodiment is an important safety feature for operation of a motor vehicle with an electric drive.

Further advantages and features of the invention can be found in the claims and in the following description of a preferred example of the invention that are explained on the basis of the drawing.

DETAILED DESCRIPTION

The drive unit preferably has a brushless DC motor operated with direct current which is in turn generated from alternating current or three-phase current by rectifiers. Preferably, a pulsating direct current is generated at which frequency and amplitude change in time-dependent manner as soon as the current changes. This effect is used in accordance with the invention to allow the locking or non-locking of the charging flap to be detected.

A charging flap system according to FIGS. 1 to 7 has a charging port 1 fitted on the vehicle and surrounding a socket area 2 in which one or more charging sockets are permanently arranged on the vehicle in a manner not shown in detail. The charging sockets are connected to a power storage system on the vehicle side which is intended for supplying an electric drive of the passenger car.

Figure 1:
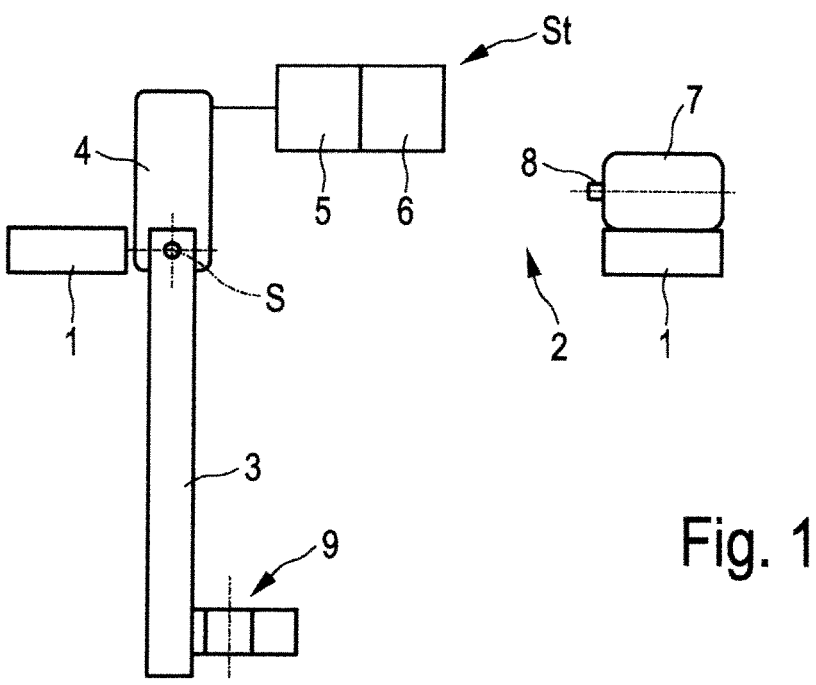
FIGS. 1 to 7 show schematically an embodiment of a charging flap system in accordance with the invention for a passenger car in different function positions.
Figure 2:
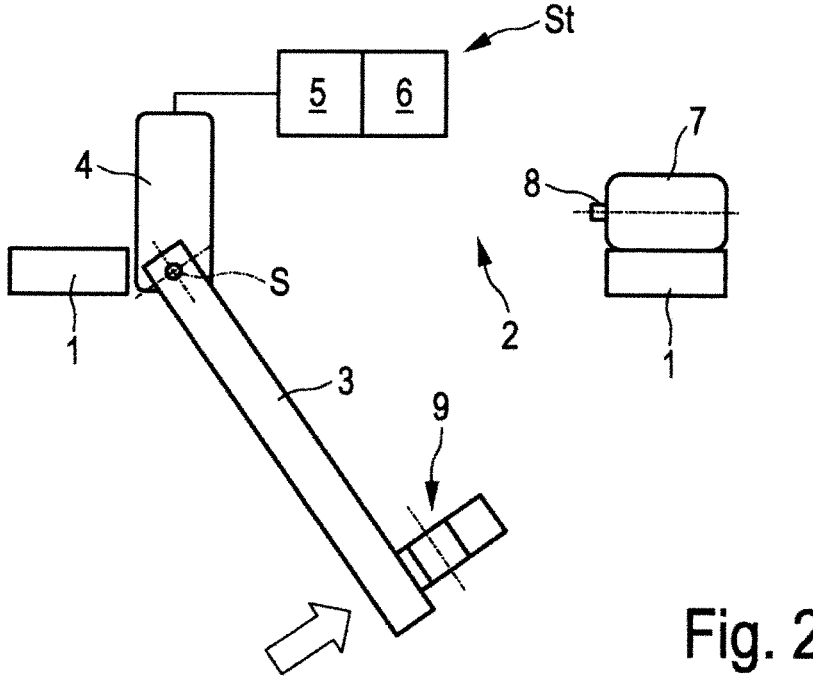
Figure 3:
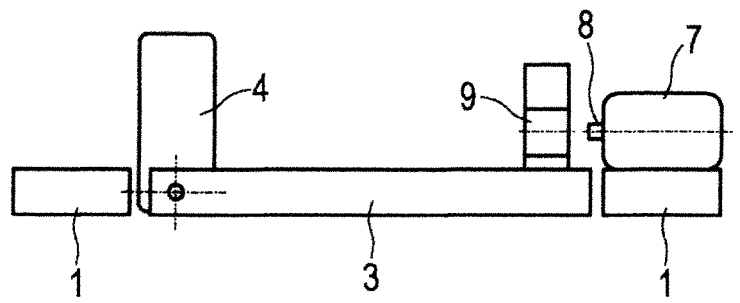

The socket area 2 of the charging port 1 is closable by a charging flap 3 which is mounted on one side of the socket area 2 at the charging port 1, and hence on the vehicle side, as to be swivelable about a swivel axis S between an opened position shown in FIG. 1 and a closed position shown in FIG. 3. The charging flap 3 is moved by means of an electric drive unit 4 between the opened position and the closed position in both directions of rotation. The electric drive unit 4 has an electric drive motor, which may be designed as a brushless DC motor. Alternatively, the electric drive motor may be formed by a three-phase motor or by an alternating current motor. The electric drive unit 4 is supplied with current by a battery on the vehicle side, in particular by the current storage that also feeds the electric drive.

Also, a blocking device 7, which has a linearly movable locking pin 8, is associated with the charging flap 3 in its closed position. The blocking device 7 may be operated pneumatically, hydraulically, mechanically or electrically in order to move the locking pin 8 between a blocking position and a release position. The locking pin 8 interacts with a locking pin receptacle 9 on the charging flap 3. The locking pin receptacle 9 has a clear cross-section which is larger than a cross-section of the locking pin 8, so that the charging flap 3 remains swivelable to a limited extent, even in the locked state in which the locking pin 8 is inserted into the locking pin receptacle 9 of the charging flap 3 in its closed position.

Figure 4:
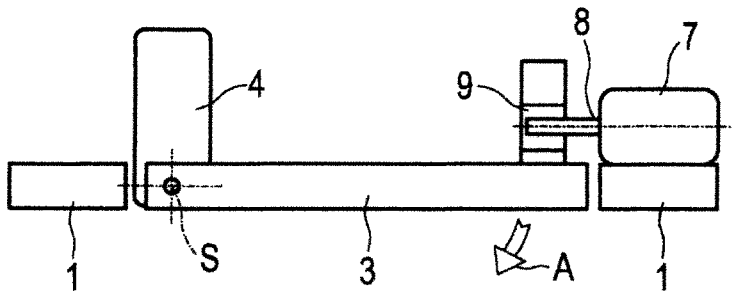
Figure 5:
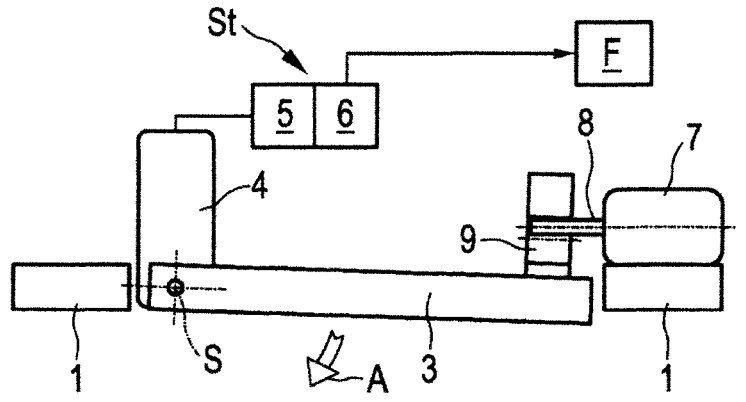

To control the electric drive unit 4, an electronic control unit St is provided which according to FIG. 5 is coupled to a control F of the electric drive of the passenger car. The coupling is provided such that the electric drive is not enabled to start by the control F until the electronic control unit St of the control F has signaled that the charging flap 3 is in a locked state in its closed position. The locked or non-locked state is detected in accordance with the invention not by an external sensor system associated with the blocking device 7 or with the locking pin 8; instead the locked or non-locked state is directly monitored by the electronic control unit St. To do so, the electronic control unit St has a monitoring system which is stored as a two-part data processing program in a memory of the electronic control unit St. The electronic control unit St is designed as a microcontroller. A control stage of the monitoring system acting as the control function 5 is intended to control the drive unit 4 in the closed position of the charging flap 3, such that said charging flap 3 is moved out of the closed position in the direction of the opened position according to arrow A (FIGS. 4 to 7).

Also, the monitoring system has a second software stage as a monitoring function 6, which monitors in time-dependent manner over a limited period of time, preferably 250 ms, current change parameters in the current supply to the electric drive unit 4.

This results in two scenarios: if the locking pin 8 is moved properly into its locking position blocking the charging flap 3 according to FIGS. 4 and 5, then the charging flap 3 comes up against a stop formed by a rim of the locking pin receptacle 9 and by the locking pin 8 during a corresponding opening movement in the direction of the arrow A. The monitoring function 6 of the electronic control unit St detects that the electric drive unit 4 needs a greatly increased current requirement to overcome the stop when the charging flap 3 comes up against it. The corresponding current change quantity is recorded by the monitoring function 6 of the electronic control unit St and evaluated in the electric control unit St such that the locked state of the charging flap 3 is confirmed. This leads to a corresponding signal to the control F of the electric drive such that the electric drive can be started.

Figure 6:
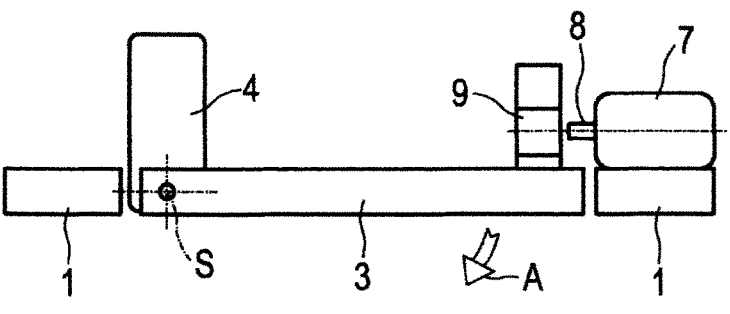
Figure 7:
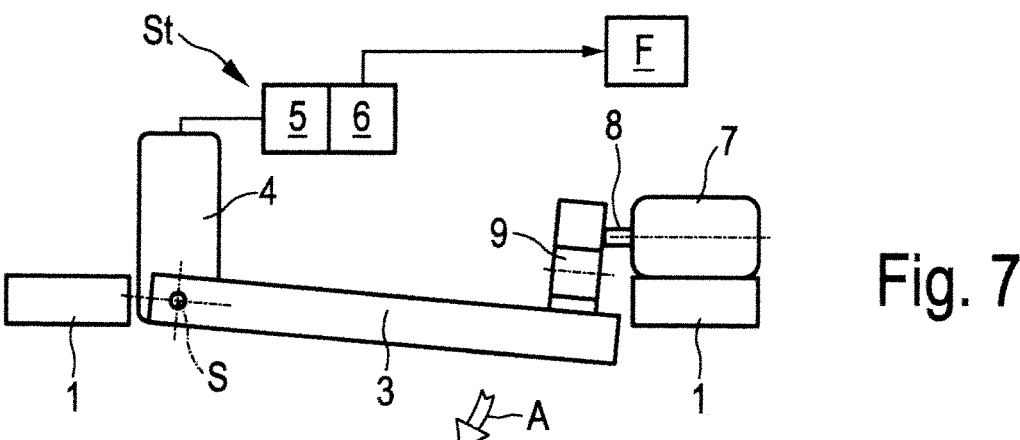

If, in accordance with FIGS. 6 and 7, the locking pin 8 is not inserted into the locking pin receptacle 9 of the charging flap 3 in its closed position, then control of the drive unit 4 by the control function 5 of the electronic control unit St in the direction of the opened position over a limited period of preferably 250 ms does not lead to any noteworthy change in the current, since the locking pin receptacle 9 does not come up against a stop. This scenario too is evaluated in the electronic control unit St and is detected as the non-locked state of the charging flap 3. The electronic control unit St accordingly transmits, to the control F of the electric drive of the passenger car, a signal that locking of the charging flap 3 in its closed position has not yet been achieved, so that the electric drive too is not enabled to start.

Figure 8:
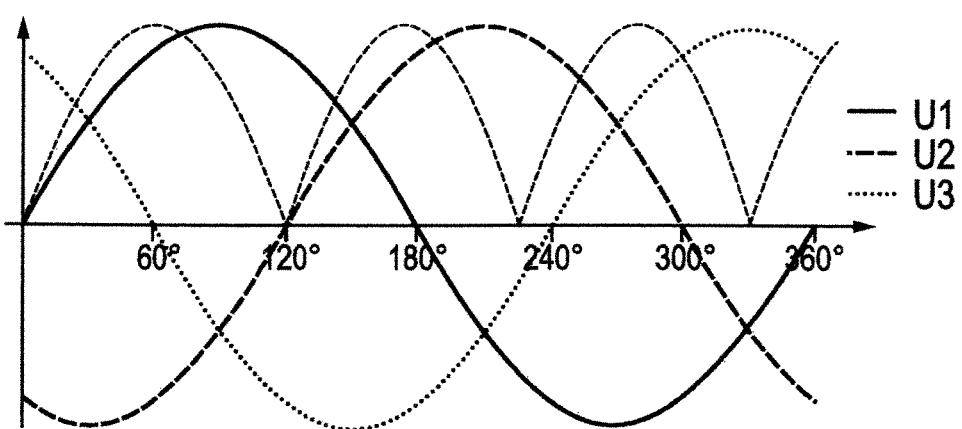
FIG. 8 shows a diagram of a time curve of several voltages of a three-phase alternating current system, and of a pulsating direct current system of an electric motor in the form of a three-phase machine for a drive unit of the charging flap system according to FIGS. 1 to 7.

FIG. 8 shows a schematic diagram over time of three voltage phases of a three-phase motor, from which a frequency of the corresponding sine curves of the three voltages U1, U2 and U3 as well as the amplitudes and corresponding zero crossings of the sine curves can be read off. In the case of a pulsating direct current, corresponding cut-off wave crests are provided only above the zero line according to FIG. 8. Here too, however, the frequency of the wave crests and the amplitude of said wave crests and the contact of wave crests with the zero line are recordable, so that in the event of corresponding current changes, analogous frequency changes, amplitude changes or changes in the zero line contacts result over time or over corresponding revolutions of an output shaft of the electric motor. A schematic representation of a corresponding pulsating direct current diagram is added as dashed lines in FIG. 8.

The invention claimed is:

1. A charging flap system for a motor vehicle having a charging port on a side thereof, comprising:

a charging flap movable between a closed position closing the charging port and an opened position exposing the charging port;

an electric drive unit that moves the charging flap between the opened position and the closed position;

an electronic control unit for controlling the drive unit;

a blocking device for locking or releasing the charging flap in the closed position, the blocking device having a blocking state preventing substantial movement of the charging flap when in the closed position to define a locked state of the charging flap, the blocking device having an unblocked state allowing movement of the charging flap when in the closed position to define a non-locked state of the charging flap;

a monitoring device for detecting the locked state or the non-locked state of the charging flap in the closed position; and, a monitoring system associated with the control unit and comprising the monitoring device, the monitoring device comprising a control function for the control unit and a monitoring function for the blocking device that interact with one another such that the control function moves the charging flap in a direction of the opened position when the charging flap is in the closed position, and the monitoring function records, in a time-dependent manner, at least one parameter allowing detection of the locked or non-locked state of the charging flap in the closed position.

2. The charging flap system according to claim 1, further including a sensor system that detects a change in position of the charging flap after activation of the control function and is connected to the control unit.

3. The charging flap system according to claim 2, further including a force sensor associated with the charging flap and coupled to the monitoring function to transmit force values to the monitoring function in a time-dependent manner, the monitoring function recording the force values as the at least one parameter.

4. The charging flap system according to claim 1, wherein the monitoring function is configured to record at least one current change parameter of the drive unit as the at least one parameter in a time-dependent manner.

5. The charging flap system according to claim 4, wherein the at least one current change parameter comprises a current level change evaluable by the control unit of the drive unit.

6. The charging flap system according to claim 4, wherein the at least one current change parameter comprises a change in a current ripple evaluable by the control unit of the drive unit.

7. The charging flap system according to claim 1, wherein the control unit comprises a memory and is configured as a data processing system, and the control function and the monitoring function are integrated into a data processing program stored in the memory of the control unit.

8. The charging flap system according to claim 1, wherein the control unit is coupled to a drive control of the motor vehicle such that starting of the drive control is blocked when the non-locked state of the charging flap is detected in the closed position of said charging flap.

9. The charging flap system according to claim 1, wherein the at least one parameter comprises at lease one electric parameter.

10. The charging flap system according to claim 1, wherein the blocking device comprises an electrically operable blocking device.

11. The charging flap system according to claim 1, wherein the blocking device has a component movable between locked and unlocked positions respectively defining the blocked and unblocked states of the blocking device.

12. The charging flap system according to claim 11, wherein the component comprises a locking pin and the charging flap comprises a receptacle sized to receive the locking pin, the locking pin being engaged with the receptacle in the blocked state of the blocking device and disengaged with the receptacle in the unblocked state of the blocking device.

13. A charging flap system for a motor vehicle having a charging port on a side thereof, comprising:

a charging flap movable between a closed position closing the charging port and an opened position exposing the charging port;

an electric drive unit that moves the charging flap between the opened position and the closed position;

an electronic control unit for controlling the drive unit;

a blocking device for locking or releasing the charging flap in the closed position;

a monitoring device for detecting a locked state or a non-locked state of the charging flap in the closed position; and a monitoring system associated with the control unit and comprising the monitoring device, the monitoring device comprising a control function for the control unit and a monitoring function for the blocking device that interact with one another such that the control function moves the charging flap in a direction of the opened position when the charging flap is in the closed position, and the monitoring function records, in a time-dependent manner, at least one current change parameter of the drive unit allowing detection of the locked or non-locked state of the charging flap in the closed position, wherein the at least one current change parameter comprises a current phase change evaluable by the control unit of the drive unit.

14. A charging flap system for a motor vehicle, the charging flap system comprising:

a charging flap;

an electric drive unit operatively connected to the charging flap to move the charging flap between a closed position and an open position, the charging flap in the closed position closing the charging port and in the open position exposing the charging port;

a blocking device cooperating with the charging flap to lock or release the charging flap in the closed position, the blocking device having a blocking state preventing substantial movement of the charging flap when in the closed position to define a locked state of the charging flap, the blocking device having an unblocked state allowing movement of the charging flap when in the closed position to define a non-locked state of the charging flap; and an electronic control unit connected to and controlling the drive unit, the electronic control unit comprising a monitoring system configured to detect the locked or non-locked state of the charging flap in the closed position, the monitoring system comprising a control function for the control unit and a monitoring function for the blocking device, the control function moving the charging flap in a direction of the open position when the charging flap is in the closed position, and the monitoring function comprising recording at least one parameter in a time-dependent manner to permit detection of the locked or non-locked state of the charging flap in the closed position.

15. The charging flap system according to claim 14, wherein the at least one parameter comprises at least one electric parameter.

16. The charging flap system according to claim 14, wherein the blocking device comprises an electrically operable blocking device.

17. The charging flap system according to claim 14, wherein the blocking device has a component movable between locked and unlocked positions respectively defining the blocking and unblocked states of the blocking device.

18. The charging flap system according to claim 17, wherein the component comprises a locking pin and the charging flap comprises a receptacle sized to receive the locking pin, the locking pin being engaged with the receptacle in the blocking state of the blocking device and disengaged with the receptacle in the unblocked state of the blocking device.

* * * * *